E. BUSSEY.

Cooking Stove.

No. 2,319.

Reissued July 24, 1866.

Witnesses;

Marcus P. Norton

J. H. Phillips

Inventor;

Ezek. Bussey

N. PETERS, PHOTO-LITHOGRAPHER, WASHINGTON, D. C.

UNITED STATES PATENT OFFICE.

ESEK BUSSEY, OF TROY, NEW YORK.

COOKING-STOVE.

Specification forming part of Letters Patent No. 51,292, dated December 5, 1865; Reissue No. 2,319, dated July 24,1866.

*To all whom it may concern:*

Be it known that I, ESEK BUSSEY, of the city of Troy, county of Rensselaer, and State of New York, have invented new and useful Improvements in Cooking-Stoves, for and upon which Letters Patent of the United States of America were granted to me bearing date the 5th day of December, 1865; and I do hereby declare that the following is a full, clear, and exact description of the nature, construction, and operation of the same, reference being hereby had to the accompanying drawings, which make a part of this my new, corrected, and amended specification; and I now surrender the said Letters Patent in order that the invention and improvements aforesaid may herein be more fully specified and set forth, and by such amended specifications, drawings, and claims my rights thereto therein shall be more fully and permanently protected, as by law provided.

Like letters represent and refer to like or corresponding parts in the accompanying drawings.

Figure 4:
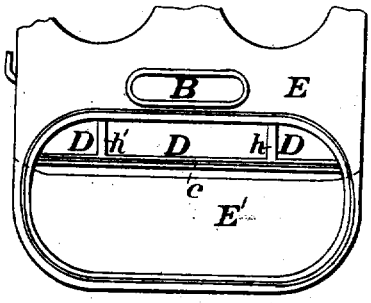
Figure 1:
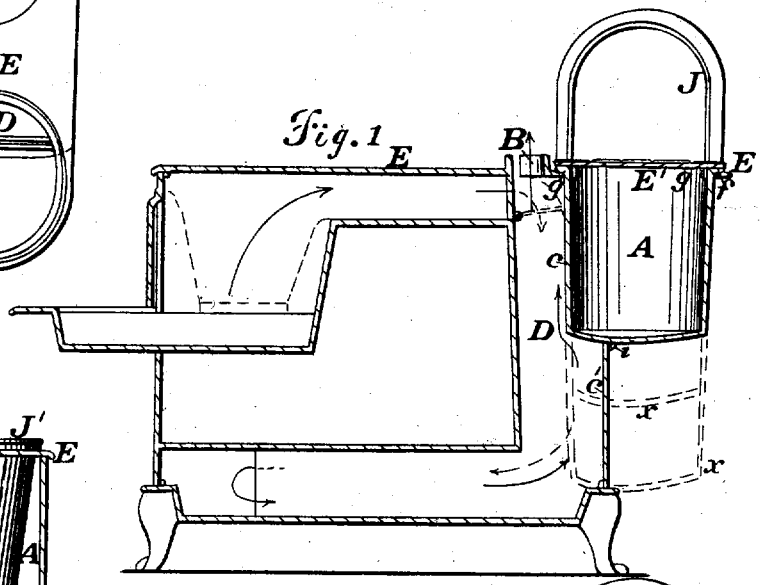
Figure 2:
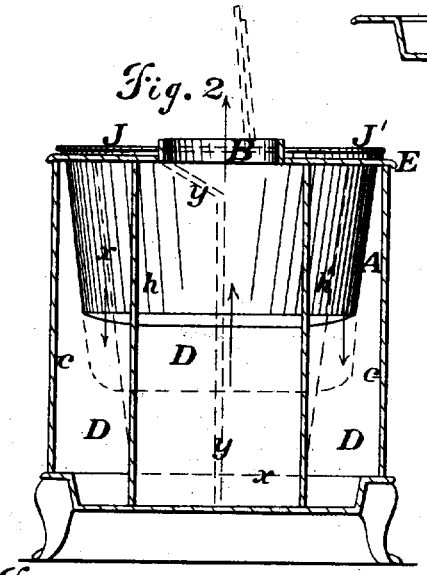
Figure 5:
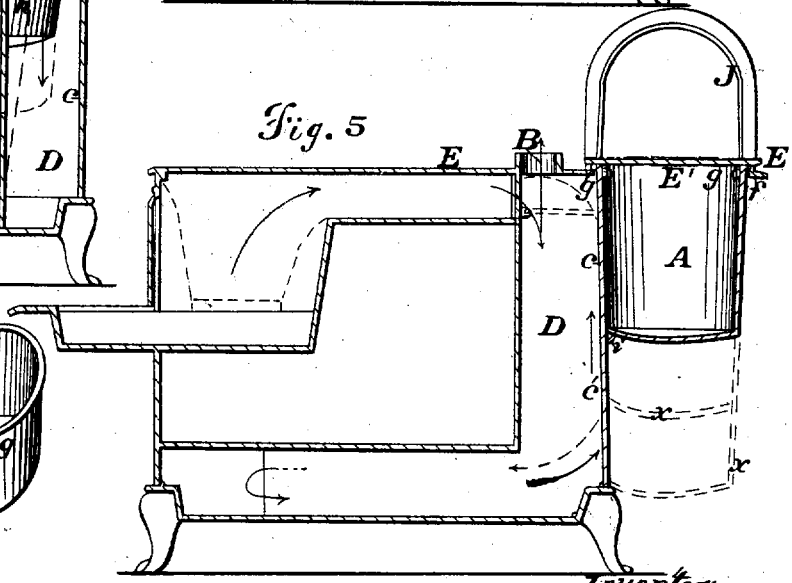
Figure 3:
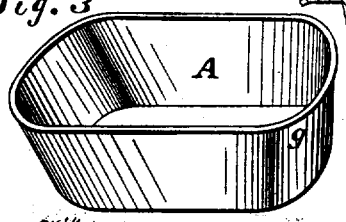

Figure 1 is a central and vertical section from front to the rear of a cooking-stove, showing my invention and improvements thereto applied in such manner that the hot air and escaping products of combustion shall pass directly under a part or portion of the bottom of the reservoir or boiler, and at the same time come in contact with that side, part, or portion of said boiler which forms and completes the whole or part of the end plate of the stove, as herein described. Fig. 2 is a section on a line between the rear-end oven vertical plate and the reservoir or boiler aforesaid. Fig. 3 is a perspective view of said reservoir or boiler, and which is constructed, arranged, and combined with a cooking-stove in the manner substantially as shown at Figs. 1 and 2 and at Fig. 5, and for the purposes substantially as hereinafter described and set forth. Fig. 4 is a top view of the rear end of such stove, and showing the extension or outward rear-end projection of the top plate, which plate contains an opening, hole, or aperture of size, form, or shape to correspond to the size, form, and shape of the upper part of said boiler or reservoir, and by which the same is held, supported, or suspended in part or in whole, and in and against the rear end of said cooking-stove, in the manner and for the purposes substantially as hereinafter described and set forth. Fig. 5 also represents a cooking-stove divided on a vertical central line from front to the rear or back end thereof, and containing and showing my said invention and improvements thereto applied in such manner that the hot air or escaping products of combustion may or shall come against and in contact with all that part or portion of such reservoir or boiler which forms the back or rear vertical end plate of such stove, or some part or portion thereof, in the manner and for the purposes substantially as shown and set forth in said figure, and also at Figs. 1 and 2 of the accompanying drawings, and for the purposes described and set forth in this specification.

The nature of my said invention and improvements is substantially as follows, to wit: It consists in the outward extension and projection, in a horizontal line or plane from, over, and beyond the rear and vertical end of a cooking-stove, of the upper or top or boiler-hole plate thereof, so as to allow and permit the making or formation of an opening or suitable hole or aperture in and through that part of such plate so projecting and extending, of a sufficient size, form, or shape and capacity to correspond to and with and to receive, contain, or support in some good and substantial manner the upper part or portion of the aforesaid reservoir or boiler, and through which opening the water or other material must pass while the same enters such boiler or reservoir, when designed to be put therein for any purposes whatever, in the manner substantially as herein described and set forth.

It also consists in the employment and arrangement, as well as combination, of a boiler or reservoir aforesaid upon the immediate rear vertical end of a cooking-stove, so that that side part, portion, or surface next thereto shall form and complete the rear or outer end vertical plate of the stove or some part or portion thereof, in the manner and for the purposes substantially as herein described and set forth.

It also consists in the formation and completion of the vertical end or rear flue or flues of a stove for the exit or passage of hot air or heated products of combustion in the draft of the stove by means of the said boiler or reservoir, in such manner as to bring such hot air or escaping products of combustion against and into direct and positive contact with that part or portion of said reservoir or boiler which so forms and completes the said flue or flues of such stove, as well as to form or continue and complete the vertical end plate in whole or in part aforesaid, substantially as hereinafter described and set forth, and thereby warm or heat to any desirable degree the water or other material contained within such reservoir or boiler arranged and combined with such stove in the manner substantially as shown in the accompanying drawings.

Having thus described the nature of my said invention and improvements, I will now and here proceed to describe the construction and operation of the same, so as to enable those skilled in the art to make, manufacture, and put such invention and improvements into general or public use, which is as follows, to wit:

In the accompanying drawings, A represents the aforesaid named boiler or reservoir, which, of course, may be of any size, shape, or capacity desired, and it may be made of any suitable material which will answer the purposes required, one side of which will always be constructed in size, form, or shape to answer to and to correspond with the size, shape, and form of the rear end or other part of the cooking-stove to which it is designed to apply my said invention, so that such side of such boiler or reservoir will form and complete the rear and vertical end plate, flue, or flues, as the case may be, and which flue or flues lead to the exit-passage B, and through which pass the heated air and escaping products of combustion.

C is the lateral plate and vertical end casing of the cooking-stove, as well as of the flue or flues D.

In carrying my said invention and improvements into practical use and operation, I may, if found desirable so to do, extend the said boiler or reservoir to various widths and depths along and down the said vertical end flue or flues of said stove in the manner and form substantially as indicated in and by the dotted lines upon the accompanying drawings, as shown at *x x* in Figs. 1, 2, and 5; and I may construct the rear end of the stove in which the aforesaid boiler or reservoir and exit-passage are arranged and therewith combined, as aforesaid, and with either two lateral descending or diving flues and a central ascending flue, as shown in full lines in the said drawings, or with a descending flue on one side and an ascending flue on the other side, as indicated by the dotted lines of partition at *y y* in Fig. 2, or with one broad ascending and descending sheet-flue, or with one broad ascending sheet-flue, or by any other suitable arrangement of such flue or flues, whereby my said invention and improvements can or may be applied and thereafter carried into practical and successful use and operation.

The said boiler or reservoir should be firmly and securely attached to and in the rear end of the cooking-stove, for the purposes aforesaid, by any mechanical means suitable for that purpose, and thereby make the said flue or flues air-tight, so as to prevent any escape of smoke or other products of combustion into the room where such stove is being used.

In the accompanying drawings, the top or boiler-hole plate, E, of the stove has an elongated opening, hole, or aperture, E′, Fig. 4, and which is occupied with and which contains the said boiler or reservoir A, as in Figs. 1, 2, and 5, and which boiler or any substantial equivalent thereof may be attached to or combined with the said outward projection or extension of the said plate E in any suitable form, manner, or means, so long as said opening E′ shall correspond and conform to the size and shape of the immediate top of such boiler or reservoir A, Fig. 3.

In the accompanying drawings I have deemed it best to show but one of the various ways or means by which said boiler or reservoir may be brought into contact and combination with the said outward extended and projecting top or boiler-hole plate E, and the opening or aperture E′ therein, for the purposes substantially as foresaid, which is as follows, to wit: Surrounding the said opening or aperture E′ there is a ring-like projection, *f*, Figs. 1, 2, and 5, in which a corresponding part of the said boiler A will occupy, and there be held by the aid and means of the flange *g*, same figures, and which is upon the surrounding rim of said boiler or reservoir. So therefore any convenient means may be employed to combine the said reservoir with the aforesaid opening E′ and with the said outward projection and extension of the said plate E, which projection will in all cases correspond to and with the size and shape of the said boiler or reservoir arranged below the said extended top plate and immediately in the rear of the back end of a cooking-stove. When the said boiler A is constructed and arranged so as to form and complete the said rear end vertical plate of the stove in the manner and for the purposes substantially as aforesaid, it will remain and rest upon the projection or flange *i*, Figs. 1 and 5, which is constructed for that purpose so as to firmly and securely hold said boiler or reservoir in its required place and position, substantially as shown at Figs. 1, 2, and 5 of the said drawings, and which flange is cast upon the immediate upper edge of the vertical end plate, C′, and which is just underneath it and seen at Figs. 1 and 5. The said boiler A will rest upon said flange *i* in any suitable manner which will best carry out and into successful operation my said invention. Its location will depend upon the size of such boiler or reservoir so applied and used with such cooking-stove.

J J′ are hinged lids or covers over the said boiler or reservoir, and upon the said outward projecting and extending top or boiler-hole plate of the stove, and of course covering the said boiler immediately below and in combination with the said plate E and opening E′ therein contained, substantially as aforesaid.

The said lids or covers J J′ may be hinged at or near the center of said boiler-opening E′, substantially as shown by dotted lines at Fig. 2, or it or they may be hinged upon the side of said opening E′, or at one or both ends thereof, and upon the said extended or projecting plate E, in any good and convenient manner as may be deemed best.

The cooking-stove to which my said invention and improvements are or may be applied, substantially as aforesaid, will be made in the usual manner, and I generally prefer to make the said boiler or reservoir A of cast-iron and in but one part or piece, and which will, of course, be so made as to closely fit all that part of the said end vertical plate which may be or may have been removed, so as to allow said boiler to form and complete the aforesaid vertical end flue or flues in connection with that part of said plate remaining immediately below the said boiler A, if any there shall be, all depending, however, upon the size of the boiler or reservoir used, as aforesaid, and thereby allow the hot air and escaping products of combustion to come into direct and positive contact with the side of said boiler A, in the manner substantially as shown in the said accompanying drawings, and as hereinbefore described and set forth.

By the use of the aforesaid invention and improvements the boiler or reservoir A is more convenient to pour into and to dip out from, and it more directly, thoroughly, and completely absorbs and utilizes the excess of heat in the end or that part of the stove to which said boiler or reservoir is so attached and combined or applied than if it did not extend below the exit-passage, but was entirely or wholly above the bottom of the latter on the top of the stove.

With the said invention, the said boiler or reservoir and the exit-passage for the circulation and escape of the heated air and waste products of combustion in said stove are much less in the way of any person using the said stove in culinary operations or for other purposes, and the said boiler or reservoir absorbs and economizes more of the heat which is about passing off from the stove through said exit-passage than if the exit-passage and said boiler were arranged separate and apart from each other and in the different ends or sides of such stove. It is more convenient to so arrange and combine said boiler or reservoir upon the rear or back end of the stove, as aforesaid; but it is quite manifest that by suitably constructing and preparing one or more sides of the stove with the required or necessary flues for the passage of heat or escaping products of combustion that the said invention and improvements may then be applied; and since the said boiler or reservoir in my said invention and improvements is arranged immediately in the rear end and forming a part or whole of the rear end of the cooking-stove, or so as to form a part of or the whole of the lateral casing on the outer side of a fire flue or flues below the exit-passage for the escaping products of combustion, and so as to expose one lateral side or one part thereof of said boiler or reservoir directly to the flame or hot gases of combustion in the said vertical end and heat-conducting flue or flues aforesaid, I thus and thereby save the expense in the stove of a lateral casing between the said flue or flues and the said boiler or reservoir A, and thus and thereby cause the same to become more easily, rapidly, and highly heated, and therefore more suitable for any purpose or use required of said boiler or reservoir than if it were arranged in contact with the outer surface of a lateral casing on the outer side of said flue or flues by which the same are formed in the usual manner of completing the rear end of a cooking-stove.

The end vertical plate, C′, Figs. 1 and 5, may be made with an outward curve at or near the upper edge thereof, so as to form a permanent resting-place for the bottom and inner edge of said boiler in case it may be deemed best to contract the said vertical end flue or flues for any purpose whatever; and still my said invention and improvements will not be changed, but will remain the same in principle and operation. If, however, the said boiler extends downward unto the bottom plate of said stove, then there will be no use for or necessity of any vertical end plate or casing below said boiler, and of course that part of said boiler will rest down and upon the upper surface of said bottom plate of the stove, substantially as indicated by the dotted lines at Figs. 1, 2, and 5. I prefer, however, to construct my said invention and improvements for use substantially as shown at Fig. 5 of the accompanying drawings.

There are some other modifications of my said invention which I do not deem necessary here to describe in detail, as they are quite manifest to any mechanic of ordinary skill and who can construct my improvements and put the same into successful use and operation in the manner substantially as herein described and set forth.

The draft of the stove will be the same as usually contained in cooking-stoves, and the circulation of the heat is controlled in the usual way and by the usual means.

It is manifest that my aforesaid invention and improvements may be applied to any kind, form, or shaped cooking-stove, and thus and thereby be put into successful use and operation.

Having thus described the nature, construction, and operation of my said invention and improvements, what I claim, and desire to secure by Letters Patent of the United States of America, is—

1. The outward continuation or extension of the top plate, E, of a cooking-stove over and upon or near to the upper part or top of the boiler or reservoir A, and containing therein an opening or reservoir-aperture, E′, for receiving into said boiler A, in the manner substantially as herein described and set forth.

2. The supporting of the boiler or reservoir A upon the vertical end plate, C′, in combination with the top plate, E, of a cooking-stove, projecting or continuing outward, with an opening or aperture, E′, therein or any equivalent therefor, in the manner and for the purposes substantially as herein described and set forth.

3. The employment of the boiler or reservoir A, having its upper or open top or part in combination with the opening or aperture E′ in the top projecting plate, E, of a cooking-stove, in the manner and for the purposes substantially as herein described and set forth.

4. The arrangement, in a cooking-stove, of a culinary boiler and an exit-passage for the gases of combustion, both at one end of the stove, and so that the said boiler forms a part of the lateral casing on the outer side of a fire-flue or fire-flues in the end of the stove below the said exit-passage, in the manner substantially as and for the purposes herein described and set forth.

5. The employment and arrangement of the boiler or reservoir A, or any equivalent thereof, within and upon the rear end of a cooking-stove, and wholly or partly below the top plate thereof, so that one side of such boiler shall form and complete the lateral casing of the rear-end vertical flue or flues below the top plate thereof and the bottom of said boiler, in the manner and for the purpose substantially as herein described and set forth.

6. The construction of the rear end and vertical flue or flues of a cooking-stove by means of the boiler or reservoir A and the lower vertical end or boiler-supporting plate, C′, so that the hot air or escaping products of combustion shall come into direct contact with that part or portion of such boiler next adjoining such flue or flues, so as to warm or heat the water or other material in said boiler, in the manner substantially as herein described and set forth.

7. The removing of the lateral or vertical outside casing of a cooking-stove, or some part or portion of the same, so that the hot air or heated products of combustion may or shall come into contact with the boiler or reservoir, or some part or portion thereof next adjoining thereto or in combination therewith, in the manner and for the purposes substantially as herein described and set forth.

In testimony whereof I have, on this 7th day of July, 1866, hereto set my hand.

ESEK BUSSEY.

In presence of—
MARCUS P. NORTON,
CHARLES WALTER.